TILLOU & SHUMWAY.
Churn.
No. 55,934. Patented June 26, 1866.
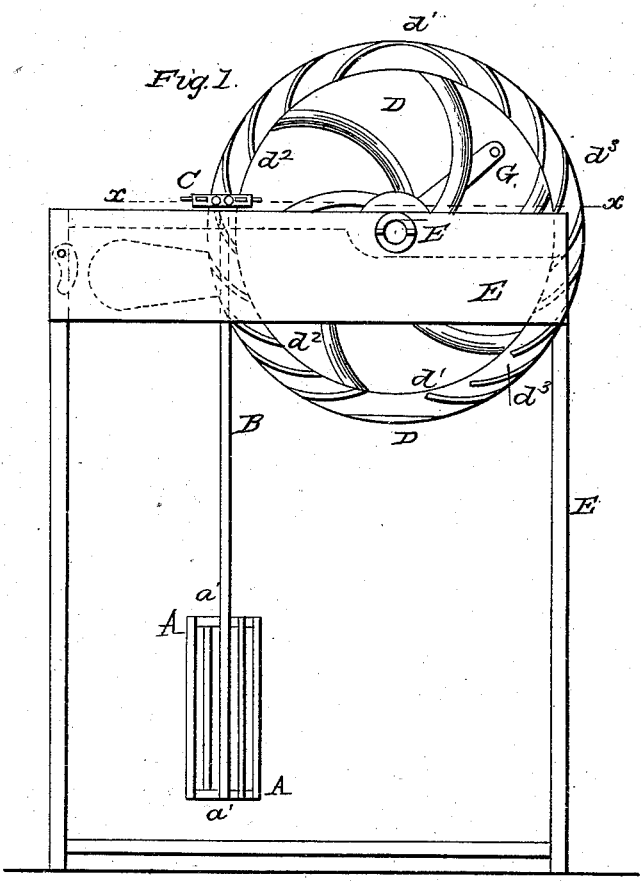
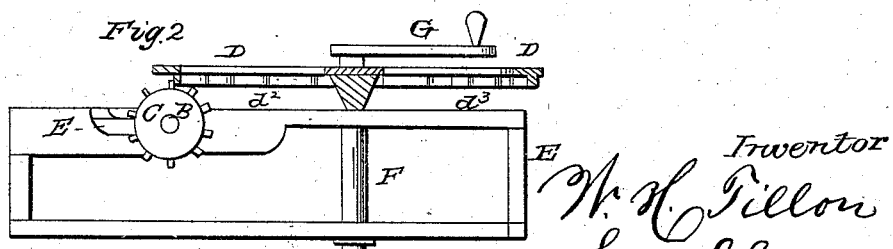

UNITED STATES PATENT OFFICE.

W. H. TILLOU AND S. SHUMWAY, OF LE ROY, NEW YORK.

IMPROVEMENT IN CHURNS.

Specification forming part of Letters Patent No. 55,934, dated June 26, 1866.

*To all whom it may concern:*

Be it known that we, W. H. TILLOU and SOLOMON SHUMWAY, of Le Roy, in the county of Genesee and State of New York, have invented a new and useful Improvement in Churns, and we do hereby declare that the following is a full, clear, and exact description thereof, which will enable others skilled in the art to make and use the same, reference being had to the accompanying drawings, forming part of this specification, in which—

Figure 1 is a side view of a frame with our improvement attached. Fig. 2 is a horizontal section of the same, taken through the line $x\ x$, Fig. 1.

Similar letters of reference indicate like parts.

Our invention has for its object to furnish an improved means for imparting a reverse or reciprocating motion to the churn-dasher, whereby the rapidity and thoroughness of the operation of churning is greatly increased; and it consists in the construction of the gear-wheel, and in its combination with the cog-wheel attached to the upper end of the dasher-handle.

The dasher A consists of two disks or series of radial arms, $a'$, attached to the dasher-handle B, and connected by a number of radial arms or bars, $a^2$, the number of which will depend upon the capacity of the churn. The upper end of the handle B works in suitable bearings attached to the upper part of the churn, or to a frame, E, prepared for that purpose, and also to support the gearing for operating the said dasher-handle B.

To the upper end of the handle B is attached a small horizontal cog-wheel, C, the teeth or cogs of which mesh into the teeth or cogs of the large cog-wheel D, as shown in Figs. 1 and 2.

D is a vertical cog-wheel attached to the horizontal shaft F. This shaft F revolves in bearings in the frame E, as shown in Figs. 1 and 2. G is a crank attached to the end of the shaft F, as shown in Fig. 2, by means of which the machine is operated; or the crank G may be replaced by a pulley, and the churning done by any convenient power.

The cogs $d^1\ d^2\ d^3$ are arranged upon the side or edge of the rim of the wheel D, and are curved, as represented in the drawings. Two of them, $d'$, are double curves, and are designed to reverse the motion of the dasher, which is done twice during each revolution of the wheel D. The others, $d^2$ and $d^3$, are curved in directly opposite directions, as shown in Fig. 1, so as to transfer the cogs of the wheel C to or receive them from the double-curved flanges or cogs $d'$ without any violent jar in reversing the motion of the said cog-wheel C.

By reversing the motion of the dasher in this way so often the cream or milk is kept continuously in violent agitation, which brings the butter in a very short time, and a greater amount of butter is produced from the cream or milk than can be produced with an ordinary dasher when the said dasher is operated in the ordinary manner.

We claim as new and desire to secure by Letters Patent—

The gear or cog wheel D, constructed with curved cogs or flanges on the side of its rim, substantially as herein described, in combination with the cog-wheel C of the dasher-handle B, for the purpose of frequently reversing the motion of the dasher A.

WM. H. TILLOU.
SOLOMON SHUMWAY.

Witnesses:
JOHN G. BIXBY,
LUTHER E. HOWES.